(12) United States Patent
Conti

(10) Patent No.: US 12,086,293 B2
(45) Date of Patent: *Sep. 10, 2024

(54) METHOD AND SYSTEM FOR PREVENTING UNAUTHORIZED PROCESSOR MODE SWITCHES

(71) Applicant: TEXAS INSTRUMENTS INCORPORATED, Dallas, TX (US)

(72) Inventor: Gregory R. Conti, Saint Paul (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,202

(22) Filed: Jun. 9, 2023

(65) Prior Publication Data

US 2023/0342502 A1 Oct. 26, 2023

Related U.S. Application Data

(63) Continuation of application No. 17/182,393, filed on Feb. 23, 2021, now Pat. No. 11,675,934, which is a (Continued)

(30) Foreign Application Priority Data

Dec. 23, 2005 (EP) ..................................... 05292787

(51) Int. Cl.
*G06F 21/74* (2013.01)
*G06F 1/24* (2006.01)
(Continued)

(52) U.S. Cl.
CPC ................ *G06F 21/74* (2013.01); *G06F 1/24* (2013.01); *G06F 1/3287* (2013.01); *G06F 21/52* (2013.01);
(Continued)

(58) Field of Classification Search
CPC .......... G06F 21/74; G06F 1/24; G06F 1/3287; G06F 21/52; G06F 21/53; G06F 21/567;
(Continued)

(56) References Cited

U.S. PATENT DOCUMENTS 5,134,700 A * 7/1992 Eyer ....................... G06F 21/74
711/E12.1
5,533,123 A 7/1996 Force et al.
(Continued)

OTHER PUBLICATIONS

Clifton et al., "A Microprocessor Design for Multilevel Security", Sep. 1988, Fourth Aerospace Computer Security Applications, pp. 194-198 (Year: 1988).*

(Continued)

*Primary Examiner* — Kenneth W Chang
(74) *Attorney, Agent, or Firm* — Kenneth Liu; Frank D. Cimino

(57) ABSTRACT

Disclosed embodiments relate to a system having a processor adapted to activate multiple security levels for the system and a monitoring device coupled to the processor and employing security rules pertaining to the multiple security levels. The monitoring device restricts usage of the system if the processor activates the security levels in a sequence contrary to the security rules.

16 Claims, 2 Drawing Sheets

Related U.S. Application Data continuation of application No. 16/444,253, filed on Jun. 18, 2019, now Pat. No. 10,949,571, which is a continuation of application No. 16/143,862, filed on Sep. 27, 2018, now Pat. No. 10,325,119, which is a continuation of application No. 15/280,495, filed on Sep. 29, 2016, now Pat. No. 10,102,400, which is a continuation of application No. 14/590,192, filed on Jan. 6, 2015, now Pat. No. 9,483,638, which is a continuation of application No. 11/343,061, filed on Jan. 30, 2006, now Pat. No. 8,959,339.

(51) Int. Cl.
| | |
|---|---|
| *G06F 1/3287* | (2019.01) |
| *G06F 21/52* | (2013.01) |
| *G06F 21/53* | (2013.01) |
| *G06F 21/56* | (2013.01) |
| *G06F 21/81* | (2013.01) |
| *H04L 9/40* | (2022.01) |

(52) U.S. Cl.
CPC ............ *G06F 21/53* (2013.01); *G06F 21/567* (2013.01); *G06F 21/81* (2013.01); *G06F 2221/034* (2013.01); *G06F 2221/2101* (2013.01); *G06F 2221/2105* (2013.01); *G06F 2221/2111* (2013.01); *G06F 2221/2113* (2013.01); *G06F 2221/2115* (2013.01); *G06F 2221/2119* (2013.01); *G06F 2221/2141* (2013.01); *G06F 2221/2149* (2013.01); *G06F 2221/2153* (2013.01); *H04L 63/105* (2013.01); *H04L 2463/102* (2013.01)

(58) Field of Classification Search
CPC ............... G06F 21/81; G06F 2221/034; G06F 2221/2101; G06F 2221/2105; G06F 2221/2111; G06F 2221/2113; G06F 2221/2115; G06F 2221/2119; G06F 2221/2141; G06F 2221/2149; G06F 2221/2153; H04L 63/105; H04L 2463/102
See application file for complete search history.

(56) References Cited

U.S. PATENT DOCUMENTS

| | | | |
|---|---|---|---|
| 5,555,382 A | 9/1996 | Thaller et al. | |
| 5,615,263 A | 3/1997 | Takahashi | |
| 5,974,549 A | 10/1999 | Golan | |
| 5,987,604 A | 11/1999 | Edrich | |
| 6,282,657 B1 | 8/2001 | Kaplan et al. | |
| 6,308,256 B1 | 10/2001 | Folmsbee | |
| 6,363,474 B1 | 3/2002 | McCulley et al. | |
| 6,366,117 B1 | 4/2002 | Pang et al. | |
| 6,507,904 B1 | 1/2003 | Ellison et al. | |
| 6,651,171 B1* | 11/2003 | England | G06F 21/53 713/193 |
| 6,694,401 B2 | 2/2004 | Nalawadi et al. | |
| 6,795,905 B1 | 9/2004 | Ellison et al. | |
| 7,130,951 B1 | 10/2006 | Christie et al. | |
| 7,165,135 B1 | 1/2007 | Christie et al. | |
| 7,254,720 B1 | 8/2007 | Giles et al. | |
| 7,401,358 B1 | 7/2008 | Christie et al. | |
| 8,099,777 B1 | 1/2012 | Maxted | |
| 2001/0047456 A1 | 11/2001 | Schrobenhauzer et al. | |
| 2002/0007456 A1 | 1/2002 | Peinado et al. | |
| 2002/0056076 A1 | 5/2002 | Made | |
| 2002/0129244 A1 | 9/2002 | DaCosta | |
| 2003/0101322 A1 | 5/2003 | Gardner | |
| 2003/0140205 A1 | 7/2003 | Dahan et al. | |
| 2003/0140245 A1 | 7/2003 | Dahan et al. | |
| 2004/0003273 A1 | 1/2004 | Grawrock et al. | |
| 2004/0105298 A1 | 6/2004 | Symes | |
| 2004/0123118 A1* | 6/2004 | Dahan | G06F 21/74 712/E9.082 |
| 2004/0158727 A1 | 8/2004 | Watt et al. | |
| 2004/0158742 A1* | 8/2004 | Srinivasan | G06F 21/52 726/4 |
| 2004/0181682 A1 | 9/2004 | Orino et al. | |
| 2004/0187117 A1 | 9/2004 | Orion et al. | |
| 2004/0210760 A1 | 10/2004 | McGrath et al. | |
| 2004/0250063 A1* | 12/2004 | Gulick | G06F 21/85 713/160 |
| 2004/0260910 A1 | 12/2004 | Watt et al. | |
| 2005/0141558 A1 | 6/2005 | Connors | |
| 2005/0210231 A1 | 9/2005 | Bouchier et al. | |

OTHER PUBLICATIONS

Joseph, Mark, Integration Problems in Fault-Tolerant, Secure Computer Design, 1991, Springer Vienna, Dependable Computing for Critical Applications, vol. 4, pp. 347-364.

Yang, et al., Fast Secure Processor for Inhibiting Software Piracy and Tampering, Dec. 2003, Proceedings on the 36th Annual IEEE/ACM International Symposium on Microarchitecture, pp. 351-360.

Hussin et al., "Mobile Ticking System Employing TrustZone Technology," Jul. 2005, International Conference on Mobile Business, pp. 651-654.

Gilmont et al., "Enhancing Security in the Memory Management Unit," Sep. 1999, Proceedings 25th EUROMICRO Conference, Informatics: Theory and Practice for the New Millenium, pp. 49-456 (Year: 1999).

* cited by examiner

METHOD AND SYSTEM FOR PREVENTING UNAUTHORIZED PROCESSOR MODE SWITCHES

CROSS-REFERENCE TO RELATED APPLICATIONS

This application is a continuation of U.S. patent application Ser. No. 17/182,393 filed on Feb. 23, 2021 (now U.S. Pat. No. 11,675,934), which is a continuation of U.S. patent application Ser. No. 16/444,253 filed on Jun. 18, 2019 (now U.S. Pat. No. 10,949,571), which is a continuation of U.S. patent application Ser. No. 16/143,862 filed on Sep. 27, 2018 (now U.S. Pat. No. 10,325,119), which is a continuation of U.S. patent application Ser. No. 15/280,495 filed on Sep. 29, 2016 (now U.S. Pat. No. 10,102,400), which is a continuation of U.S. patent application Ser. No. 14/590,192 filed on Jan. 6, 2015 (now U.S. Pat. No. 9,483,638), which is a continuation of U.S. patent application Ser. No. 11/343,061 filed on Jan. 30, 2006 (now U.S. Pat. No. 8,959,339), which claims priority to European Patent Application No. EP 05292787.8, filed Dec. 23, 2005. This application may relate to the commonly-assigned U.S. patent application entitled, "Method and System for Preventing Unsecure Memory Accesses," Serial No. 11/343,072 filed on Jan. 30, 2006. The aforementioned applications are all incorporated herein by reference.

BACKGROUND

Mobile electronic devices such as personal digital assistants (PDAs) and digital cellular telephones are increasingly used for electronic commerce (e-commerce) and mobile commerce (m-commerce). It is desired for the programs that execute on the mobile devices to implement the e-commerce and m-commerce functionality in a secure mode to reduce the likelihood of attacks by malicious programs and to protect sensitive data.

For security reasons, most processors provide two levels of operating privilege: a lower level of privilege for user programs; and a higher level of privilege for use by the operating system. The higher level of privilege may or may not provide adequate security for m-commerce and e-commerce, however, given that this higher level relies on proper operation of operating systems with vulnerabilities that may be publicized. In order to address security concerns, some mobile equipment manufacturers implement a third level of privilege, or secure mode, that places less reliance on corruptible operating system programs, and more reliance on hardware-based monitoring and control of the secure mode. U.S. Patent Publication No. 2003/0140245, entitled "Secure Mode for Processors Supporting MMU and Interrupts," incorporated herein by reference, describes a hardware-monitored secure mode for processors.

A flexible architecture providing a third level of privilege, such as that described above, may be exploitable by software attacks. Thus, there exists a need for methods and related systems to eliminate the potential for malicious software to manipulate the system into entering a secure mode and executing non-secure instructions.

BRIEF SUMMARY

Disclosed herein are techniques for preventing unauthorized processor mode switches. An illustrative embodiment includes a system comprising a processor adapted to activate multiple security levels for the system and a monitoring device coupled to the processor and employing security rules pertaining to the multiple security levels. The monitoring device restricts usage of the system if the processor activates the security levels in a sequence contrary to the security rules.

Another illustrative embodiment includes a device comprising a security bus port adapted to couple to a processing unit comprising bits which determine a security level of the processing unit. The device also comprises a security violation bus port coupled to the security bus port and logic coupled to the security and security violation bus ports and adapted to monitor the bits via the security bus port. If the logic determines that the processing unit adjusted the bits in a sequence contrary to the security rules, the logic outputs an alert signal via the security violation bus.

Yet another illustrative embodiment includes a method comprising monitoring bits in a processing unit, where the bits are indicative of a security level of the processing unit. The method also comprises determining whether the bits indicate a switch between security levels in a sequence contrary to a predetermined sequence stored on the processing unit.

Notation and Nomenclature

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
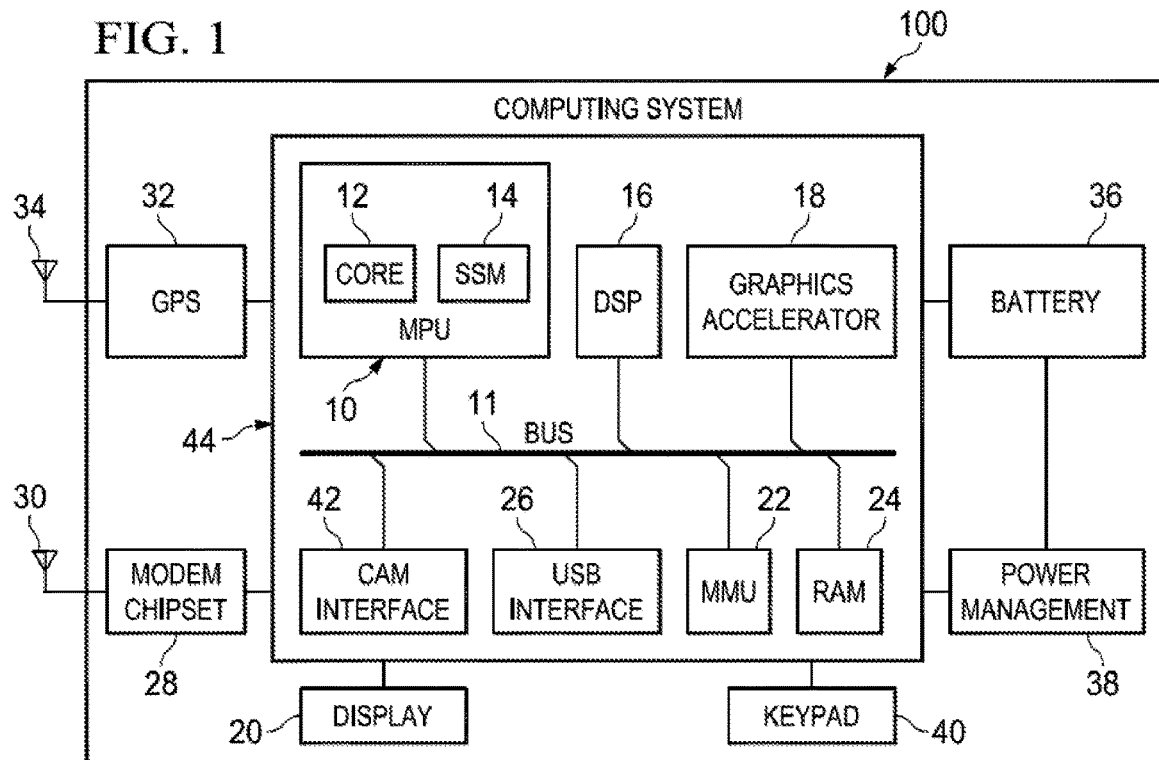
FIG. 1 shows a computing system constructed in accordance with at least some embodiments of the invention.

FIG. 1 shows a computing system 100 constructed in accordance with at least some embodiments of the invention. The computing system 100 preferably comprises the ARM® TrustZone® architecture, but the scope of disclosure is not limited to any specific architecture. The computing system 100 may comprise a multiprocessing unit (MPU) 10 coupled to various other system components by way of a bus 11. The MPU 10 may comprise a processor core 12 that executes applications, possibly by having a plurality of processing pipelines. The MPU 10 may further comprise a security state machine (SSM) 56 which, as will be more fully discussed below, aids in allowing the computer system 100 to enter a secure mode for execution of secure software, such as m-commerce and e-commerce software.

The computing system 100 may further comprise a digital signal processor (DSP) 16 that aids the MPU 10 by performing task-specific computations, such as graphics manipulation and speech processing. A graphics accelerator 18 may couple both to the MPU 10 and DSP 16 by way of the bus 11. The graphics accelerator 18 may perform necessary computations and translations of information to allow display of information, such as on display device 20. The computing system 100 may further comprise a memory management unit (MMU) 22 coupled to random access memory (RAM) 24 by way of the bus 11. The MMU 22 may control access to and from the RAM 24 by any of the other system components such as the MPU 10, the DSP 16 and the graphics accelerator 18. The RAM 24 may be any suitable random access memory, such as synchronous RAM (SRAM) or RAMBUS™-type RAM.

The computing system 100 may further comprise a USB interface 26 coupled to the various system components by way of the bus 11. The USB interface 26 may allow the computing system 100 to couple to and communicate with external devices.

The SSM 56, preferably a hardware-based state machine, monitors system parameters and allows the secure mode of operation to initiate such that secure programs may execute from and access a portion of the RAM 24. Having this secure mode is valuable for any type of computer system, such as a laptop computer, a desktop computer, or a server in a bank of servers. However, in accordance with at least some embodiments of the invention, the computing system 100 may be a mobile (e.g., wireless) computing system such as a cellular telephone, personal digital assistant (PDA), text messaging system, and/or a computing device that combines the functionality of a messaging system, personal digital assistant and a cellular telephone. Thus, some embodiments may comprise a modem chipset 28 coupled to an external antenna 30 and/or a global positioning system (GPS) circuit 32 likewise coupled to an external antenna 34.

Because the computing system 100 in accordance with at least some embodiments is a mobile communication device, computing system 100 may also comprise a battery 36 which provides power to the various processing elements. The battery 36 may be under the control of a power management unit 38. A user may input data and/or messages into the computing system 100 by way of the keypad 40. Because many cellular telephones also comprise the capability of taking digital still and video pictures, in some embodiments the computing system 100 may comprise a camera interface 42 which may enable camera functionality, possibly by coupling the computing system 100 to a charge couple device (CCD) array (not shown) for capturing digital images.

Inasmuch as the systems and methods described herein were developed in the context of a mobile computing system 100, the remaining discussion is based on a mobile computing environment. However, the discussion of the various systems and methods in relation to a mobile computing environment should not be construed as a limitation as to the applicability of the systems and methods described herein to just mobile computing environments.

In accordance with at least some embodiments of the invention, many of the components illustrated in FIG. 1, while possibly available as individual integrated circuits, are preferably integrated or constructed onto a single semiconductor die. Thus, the MPU 10, digital signal processor 16, memory controller 22 and RAM 24, along with some or all of the remaining components, are preferably integrated onto a single die, and thus may be integrated into a computing device 100 as a single packaged component. Having multiple devices integrated onto a single die, especially devices comprising a multiprocessor unit 10 and RAM 24, may be referred to as a system-on-a-chip (SoC) or a megacell 44. While using a system-on-a-chip may be preferred, obtaining the benefits of the systems and methods as described herein does not require the use of a system-on-a-chip.

Figure 2:
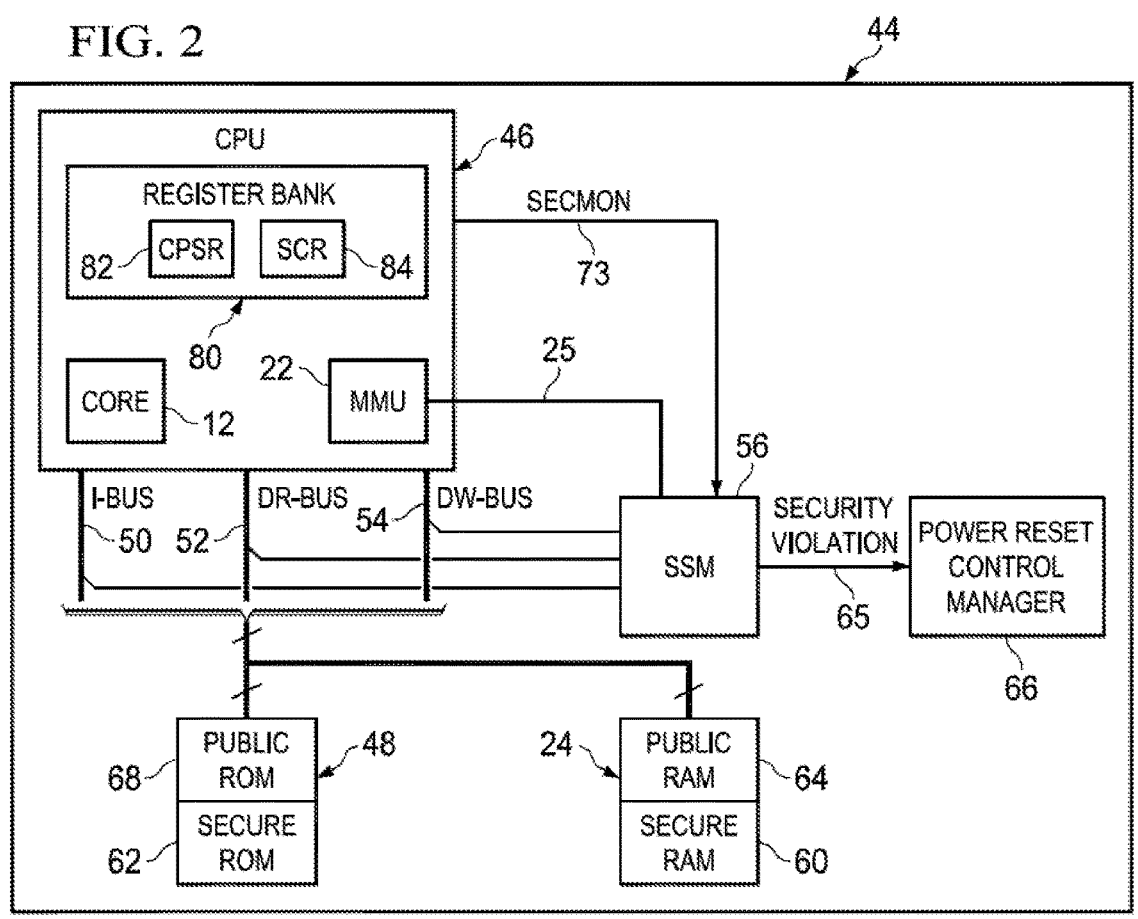
FIG. 2 shows a portion of the megacell of FIG. 1 in greater detail, and in accordance with embodiments of the invention.

FIG. 2 shows a portion of the megacell 44 in greater detail. The processor 46 comprises a core 12, a memory management unit (MMU) 22 and a register bank 80 including a current program status register (CPSR) 82 and a secure configuration register (SCR) 84, described further below. The processor 46 couples to a security state machine (SSM) 56 by way of a security monitoring (SECMON) bus 73, also described below. The processor 46 couples to the RAM 24 and ROM 48 by way of an instruction bus 50, a data read bus 52 and a data write bus 54. The instruction bus 50 may be used by the processor 46 to fetch instructions for execution from one or both of the RAM 24 and ROM 48. Data read bus 52 may be the bus across which data reads from RAM 24 propagate. Likewise, data writes from the processor 46 may propagate along data write bus 54 to the RAM 24.

The ROM 48 and the RAM 24 are partitioned into public and secure domains. Specifically, the ROM 48 comprises a public ROM 68, accessible in non-secure mode, and a secure ROM 62, accessible in secure mode. Likewise, the RAM 24 comprises a public RAM 64, accessible in non-secure mode, and a secure RAM 60, accessible in secure mode. In at least some embodiments, the public and secure domain partitions in the ROM 48 and the RAM 24 are virtual (i.e., non-physical) partitions generated and enforced by the MMU 22. The SSM 56 monitors the MMU 22 for security purposes via bus 25, as described further below.

Secure ROM 62 and secure RAM 60 preferably are accessible only in secure mode. In accordance with embodiments of the invention, the SSM 56 monitors the entry into, execution during and exiting from the secure mode. The SSM 56 preferably is a hardware-based state machine that monitors various signals within the computing system 100 (e.g., instructions on the instruction bus 50, data writes on the data write bus 52 and data reads on the data read bus 54) and activity in the processor core 12 through SECMON bus 73.

Figure 3:
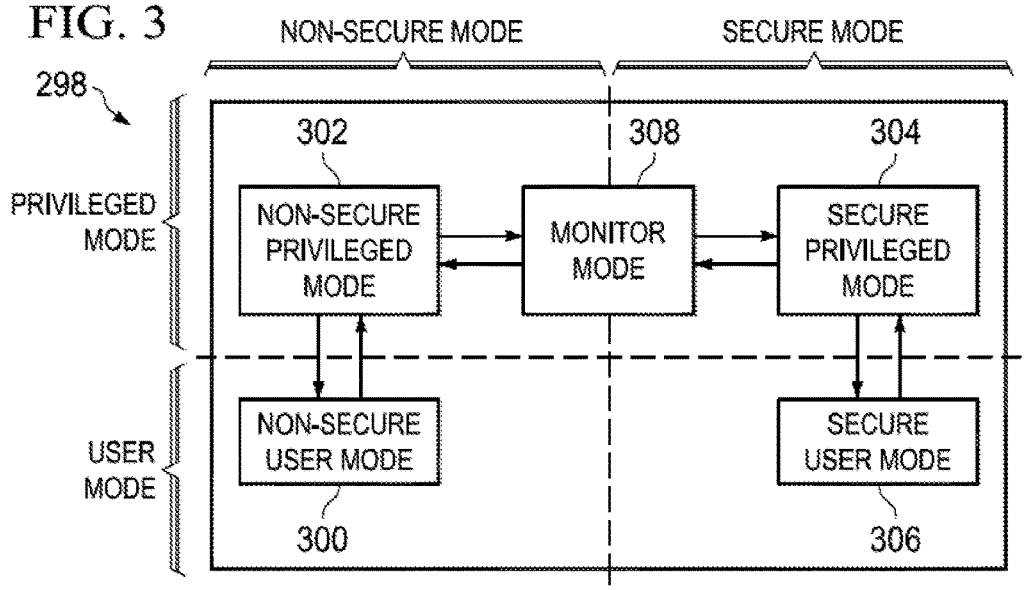
FIG. 3 shows various security modes used by the system of FIG. 1, in accordance with embodiments of the invention.

Each of the secure and non-secure modes may be partitioned into "user" and "privileged" modes. Programs that interact directly with an end-user, such as a web browser, are executed in the user mode. Programs that do not interact directly with an end-user, such as the operating system (OS), are executed in the privileged mode. By partitioning the secure and non-secure modes in this fashion, a total of four modes are made available. As shown in FIG. 3, in order of ascending security level, these four modes include the non-secure user mode 300, the non-secure privileged mode 302, the secure user mode 306, and the secure privileged mode 304. There is an intermediate monitor mode 308, described further below, between the modes 302 and 304. The computer system 100 may operate in any one of these five modes at a time.

The computer system 100 may switch from one mode to another. FIG. 3 illustrates a preferred mode-switching sequence 298. The sequence 298 is preferred because it is more secure than other possible switching sequences. For example, to switch from the non-secure user mode 300 to the secure privileged mode 304, the system 100 should first pass through non-secure privileged mode 302 and the monitor mode 308. Likewise, to pass from the secure user mode 306 to the non-secure user mode 300, the system 100 should switch from the secure user mode 306 to the secure privileged mode 304, from the secure privileged mode 304 to the monitor mode 308, from the monitor mode 308 to the non-secure privileged mode 302, and from the non-secure privileged mode 302 to the non-secure user mode 300.

Each mode switch is enacted by the adjustment of bits in the CPSR 82 and the SCR 84. The CPSR 82 comprises a plurality of mode bits. The status of the mode bits determines which mode the computer system 100 is in. Each mode corresponds to a particular combination of mode bits. The mode bits may be manipulated to switch modes. For example, the bits may be manipulated to switch from mode 300 to mode 302.

The SCR 84 comprises a non-secure (NS) bit. The status of the NS bit determines whether the computer system 100 is in secure mode or non-secure mode. In at least some embodiments, an asserted NS bit indicates that the system 100 is in non-secure mode. In other embodiments, an asserted NS bit indicates that the system 100 is in secure mode. Adjusting the NS bit switches the system 100 between secure and non-secure modes. Because the status of the NS bit is relevant to the security of the system 100, the NS bit preferably is adjusted only in the monitor mode 308, since the monitor mode 308 is, in at least some embodiments, the most secure mode.

More specifically, when the system 100 is in the monitor mode 308, the processor 46 executes monitor mode software (not specifically shown) on the secure ROM 62, which provides a secure transition from the non-secure mode to the secure-mode, and from the secure mode to the non-secure mode. In particular, the monitor mode software performs various security tasks to prepare the system 100 for a switch between the secure and non-secure modes. The monitor mode software may be programmed to perform security tasks as desired. If the processor 46 determines that these security tasks have been properly performed, the monitor mode software adjusts the NS bit in the SCR register 84, thereby switching the system 100 from non-secure mode to secure mode, or from secure mode to non-secure mode.

The NS bit and the CPSR bits are provided by the processor 46 to the SSM 56 via the SECMON bus 73. The SSM 56 uses the SECMON bus 73 to monitor any mode switches enacted by the processor 46. For example, if the system 100 switches from the non-secure user mode 300 to the non-secure privileged mode 302, the CPSR mode bits on the SECMON bus 73 reflect the mode switch. The SSM 56 receives the updated CPSR mode bits and determines that the system 100 has switched from the non-secure user mode 300 to the non-secure privileged mode 302. Likewise, if the system 100 switches from the non-secure privileged mode 302 to the secure privileged mode 304, the processor 46 updates the CPSR mode bits to reflect the mode switch, and further unasserts the NS bit in the SCR 84 to reflect the switch from the non-secure mode to the secure mode. Upon receiving the updated CPSR mode bits and the NS bit, the SSM 56 determines that the system 100 has switched from the non-secure mode to the secure mode and, more specifically, from the non-secure privileged mode 302 to the secure privileged mode 304.

The SSM 56 uses the SECMON bus 73 in this way to ensure that the processor 46 does not take any action that may pose a security risk. For example, for security reasons, the processor 46 preferably adjusts the NS bit in the SCR 84 only when the system 100 is in the monitor mode 308. The SSM 56 uses the SECMON bus 73 to ensure that the processor 46 does not adjust the NS bit when the system 100 is not in monitor mode 308. Thus, if the SSM 56 detects that the NS bit is being adjusted by the processor 46 and the CPSR 82 mode bits indicate that the system 100 is in the monitor mode 308, the SSM 56 takes no action. However, if the SSM 56 detects that the NS bit is being adjusted and the CPSR mode bits indicate that the system 100 is not in monitor mode 308 (e.g., the system 100 is in one of the modes 300, 302, 304 or 306), the SSM 56 may report a security violation to the power reset control manager 66 via the security violation bus 65. The power reset control manager 66 then may reset the system 100. The SSM 56 also may take any of a variety of alternative actions to protect the computer system 100. Examples of such protective actions are provided in the commonly owned patent application entitled, "System and Method of Identifying and Preventing Security Violations Within a Computing System," U.S. patent application Ser. No. 10/961,748, incorporated herein by reference.

In addition to monitoring the NS bit and/or CPSR bits, the SSM 56 also may use the SECMON bus 73 to ensure that when switching modes, the processor 46 does not deviate from the preferred mode switching path shown in FIG. 3. In particular, the SSM 56 monitors the CPSR bits provided on the SECMON bus 73. Each mode (e.g., mode 300, 302, 304, 306, and 308) corresponds to a particular combination of CPSR bits. By decoding the CPSR bits provided on the SECMON bus 73, the SSM 56 determines the mode in which the computer system 100 is operating. If, in decoding the CPSR bits, the SSM 56 determines that the processor 46 has performed an illegal mode switch (e.g., from mode 300 to mode 304 without first passing through modes 302 and 308), the SSM 56 reports a security violation to the power reset control manager 66 via the security violation bus 65. The SSM 56 alternatively may take any other suitable action(s) to protect the computer system 100, such as those disclosed in the U.S. patent application Ser. No. 10/961,748 referenced above.

In addition to monitoring the NS bit, the SSM 56 also may use the SECMON bus 73 in conjunction with the MMU bus 25 to monitor the MMU 22 and to ensure that the MMU's activities do not compromise the security of the computer system 100. For example, for security reasons, it is undesirable for the MMU 22 to be disabled when switching from non-secure mode to secure-mode. Accordingly, the SSM 56 checks bus 25 to ensure that the MMU 22 is enabled when the NS bit on the SECMON bus 73 indicates that the system 100 is switching from the non-secure mode to the secure mode. For example, if the MMU 22 is disabled when the NS bit is unasserted, the SSM 56 reports a security violation to the power reset control manager 66 via the security violation bus 65. Alternatively, the SSM 56 may take any of the protective actions mentioned above.

For security reasons, it is also undesirable to fetch instructions from public (i.e., unsecure) memory when in the secure or monitor modes. For this reason, the SSM 56 may monitor both the instruction bus 50 and the SECMON bus 73 to ensure that while the system 100 is in either the monitor mode or secure mode, the processor 46 does not fetch an instruction from the public ROM 68 and/or the public RAM 64. If the SSM 56 detects that an instruction tagged as "unsecure" is fetched on the instruction bus 50 while bits on the SECMON bus 73 indicate that the system 100 is in monitor or secure mode, the SSM 56 reports a security violation to the power reset control manager 66 via the security violation bus 65. The SSM 56 also may take alternative measures to protect the computer system 100 as mentioned above.

For security reasons, it is also undesirable to read data from and/or write data to public (i.e., unsecure) memory when in the monitor mode. For this reason, the SSM 56 may monitor the data read bus 52, the data write bus 54 and the SECMON bus 73 to ensure that the processor 46 does not read data from and/or write data to either the public ROM 68 and/or the public RAM 64 while the system 100 is in the monitor mode. For example, if the SSM 56 detects that data read from the public ROM 68 is being carried on the data read bus 52 while bits on the SECMON bus 73 indicate that the system 100 is in the monitor mode, the SSM 56 reports a security violation to the power reset control manager 66 or takes some other suitable, protective measure. In another example, if the SSM 56 detects that data is being written to the public RAM 64 via data write bus 54 and the SECMON bus 73 indicates that the system 100 is in monitor mode, the SSM 56 takes a suitable, protective measure (e.g., reports a security violation to the power reset control manager 66).

Figure 4:
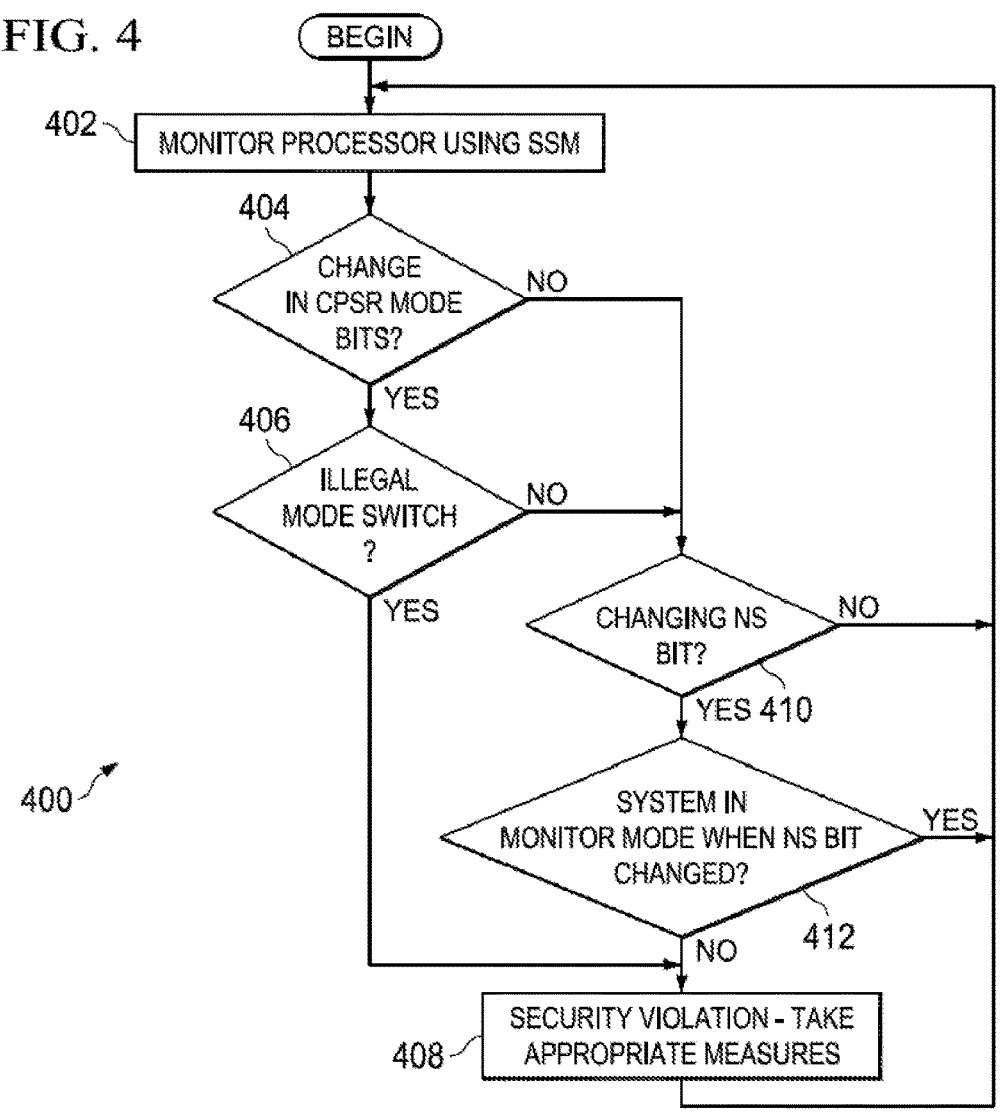
FIG. 4 shows a flow diagram of an exemplary method in accordance with embodiments of the invention.

FIG. 4 illustrates a flow diagram of a process 400 used to monitor the computer system 100 for at least some of the security violations mentioned above. The process 400 begins by monitoring the processor 46 using the SSM 56 (block 402). The process 400 further comprises determining whether one or more of the CPSR mode bits have been altered (block 404). As mentioned above, the SSM 56 determines whether one or more of the CPSR mode bits have been altered by monitoring the SECMON bus 73. If any of the CPSR mode bits have been altered, the process 400 comprises determining whether an illegal mode switch has occurred (block 406). An illegal mode switch may be, for example, a deviation from the preferred mode switching pattern shown in FIG. 3. The pattern may be stored, for instance, on the CPU 46 or on one of the memories 24 or 48. If an illegal mode switch has occurred, the process 400 comprises reporting a security violation and taking one or more suitable, protective measures (block 408).

Otherwise, the process 400 then comprises using the SECMON bus 73 to determine whether the NS bit is being changed (block 410). If the NS bit is being changed, the process 400 comprises using the CPSR bits on the SECMON bus 73 to determine whether the change is occurring (or occurred) with the computer system 100 in the monitor mode (block 412). If the change in the NS bit is occurring (or occurred) with the computer system 100 in a mode other than the monitor mode, the process 400 comprises reporting a security violation and taking one or more suitable, protective measures (block 408).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electronic device comprising:
   a processor operable in a plurality of operating modes including a secure mode and a non-secure mode;
   a register including a register bit to indicate whether the processor is operating in the secure mode or the non-secure mode;
   a memory system to store instructions and data, wherein the instructions include secure instructions and non-secure instructions and the data includes secure data and non-secure data;
   an instruction bus to provide for transferring of the instructions between the memory system and the processor; and
   at least one data bus to provide for transferring of the data between the memory system and the processor, the at least one data bus and the instruction bus being separate from each other;
   wherein fetching of a non-secure instruction from the memory system by the processor is prevented when the register bit indicates that the processor is operating in the secure mode.

2. The electronic device of claim 1, wherein the memory system includes a first memory to store the instructions and a second memory to store the data.

3. The electronic device of claim 2, wherein the at least one data bus includes:
   a first data bus to provide for transferring write data from the processor to the second memory; and
   a second data bus to provide for transferring read data from the second memory to the processor.

4. The electronic device of claim 2, wherein:
   the first memory includes a secure region and a non-secure region;
   the secure instructions are stored in the secure region of the first memory; and
   the non-secure instructions are stored in the non-secure region of the first memory.

5. The electronic device of claim 2, wherein:
   the second memory includes a secure region and a non-secure region;
   the secure data is stored in the secure region of the second memory; and
   the non-secure data is stored in the non-secure region of the second memory.

6. The electronic device of claim 5, wherein the plurality of operating modes further includes an intermediate mode, the processor being further operable in the intermediate mode to transition between the non-secure mode and the secure mode.

7. The electronic device of claim 6, wherein reading of non-secure data is prevented when the processor is operating in the intermediate mode.

8. The electronic device of claim 6, wherein a value of the register bit can only be changed when the processor is operating in the intermediate mode.

9. An apparatus comprising:
   a processor operable in a plurality of operating modes including a secure mode and a non-secure mode;

a register including a security bit to indicate whether the processor is operating in the secure mode or the non-secure mode;

a memory system to store instructions and data, wherein the instructions include secure instructions and non-secure instructions and the data includes secure data and non-secure data;

an instruction bus to provide for transferring of the instructions between the memory system and the processor;

a data bus to provide for transferring of the data between the memory system and the processor, the data bus and the instruction bus being separate from each other; and monitoring logic operable to prevent the fetching of the non-secure instructions from the memory system when the security bit indicates that the processor is operating in the secure mode.

10. The apparatus of claim 9, wherein the monitoring logic includes a state machine.

11. The apparatus of claim 10, wherein the state machine is provided by execution of secure instructions stored in the memory system.

12. The apparatus of claim 9, wherein the memory system includes a first memory to store the instructions and a second memory to store the data.

13. The apparatus of claim 9, wherein the plurality of operating modes further includes an intermediate mode, the processor being further operable in the intermediate mode to transition between the non-secure mode and the secure mode.

14. The apparatus of claim 13, wherein the monitoring logic is operable to cause a protective action to be performed in response to determining an occurrence of a security violation, the security violation being an attempt by the processor to switch from operating in the non-secure mode to operating in the secure mode without first transitioning to the intermediate mode.

15. The apparatus of claim 14, wherein the protective action is a power reset of the apparatus.

16. The apparatus of claim 15, comprising a power reset controller operable to cause the power reset of the apparatus in response to receiving an indication of the security violation.

* * * * *